United States Patent
Wu

[11] Patent Number: 6,149,245
[45] Date of Patent: Nov. 21, 2000

[54] WHEEL MOUNTING STRUCTURE FOR A GOLF CART

[75] Inventor: Jiin-Tang Wu, Taipei Hsien, Taiwan

[73] Assignee: Masters Cy Industrial Co., Ltd., Taipei Hsien, Taiwan

[21] Appl. No.: 09/244,512

[22] Filed: Feb. 4, 1999

[51] Int. Cl.$^7$ ........................................ B60B 37/00
[52] U.S. Cl. ........................................ 301/111; 301/119
[58] Field of Search ........................ 301/111, 119, 301/120, 121, 124.2; 403/315, 320, 321, 322.4

[56] References Cited

U.S. PATENT DOCUMENTS

| | | | |
|---|---|---|---|
| 4,400,038 | 8/1983 | Hosokawa | 301/124.2 |
| 5,022,333 | 6/1991 | McClure et al. | 301/111 X |
| 5,997,105 | 12/1999 | Wu | 301/126 X |

*Primary Examiner*—Russell D. Stormer
*Attorney, Agent, or Firm*—Varndell & Varndell, PLLC

[57] ABSTRACT

A wheel mounting structure includes a holder plate connected to the frame of a golf cart, a wheel axle holding a wheel and having a rectangular coupling block at one end fitted into a rectangular coupling hole on the holder plate, the rectangular coupling block of the wheel axle having a positioning groove at a bottom side wall thereof, and a lock lever pivoted to the holder plate and turned to lock/unlock the wheel axle, wherein the lock lever has two engagement portions bilaterally disposed on a top end thereof, which are alternatiavely forced into engagement with the positioning groove at the retangular coupling block of the wheel axle when the lock lever is turned forwards or backwards.

2 Claims, 7 Drawing Sheets

WHEEL MOUNTING STRUCTURE FOR A GOLF CART

BACKGROUND AND SUMMARY OF THE INVENTION

The present invention relates to a wheel mounting structure for a golf cart, and more particularly to such a wheel mounting structure in which the wheel axle which is coupled to a holder plate at the frame structure of the golf cart and holds a wheel is locked when the lock lever which is pivoted to the holder plate is turned forwards or backwards.

U.S. Pat. No. 5,658,054 discloses a wheel mounting structure, which comprises a wheel shaft fastened to a locating hole on the leg of a golf club carrier to hold a wheel, and a lever pivoted to the leg and turned to lock the wheel shaft. This wheel shaft positioning arrangement is functional, however the wheel shaft is locked only when the lever is turned in one particular direction. If the lever is turned in the reversed direction, it imparts no pressure to the wheel shaft, and the wheel shaft may fall out of place when the golf club carrier is moved.

It is the main object of the present invention to provide a wheel mounting structure which eliminates the aforesaid problem. According to the present invention, the wheel mounting structure comprises a holder plate securely fastened to the frame structure of a golf cart, a wheel axle coupled to a coupling hole at the holder plate to hold a wheel, and a lock lever pivoted to the holder plate to lock/unlock the wheel axle, wherein the lock lever has two engagement portions bilaterally disposed on the top end thereof, which are alternatively forced into engagement with a positioning groove at one end of the wheel axle to lock the wheel axle when the lock lever is turned forwards or backwards.

DETAILED DESCRIPTION OF THE PREFERRED EMBODIMENT

Figure 1:
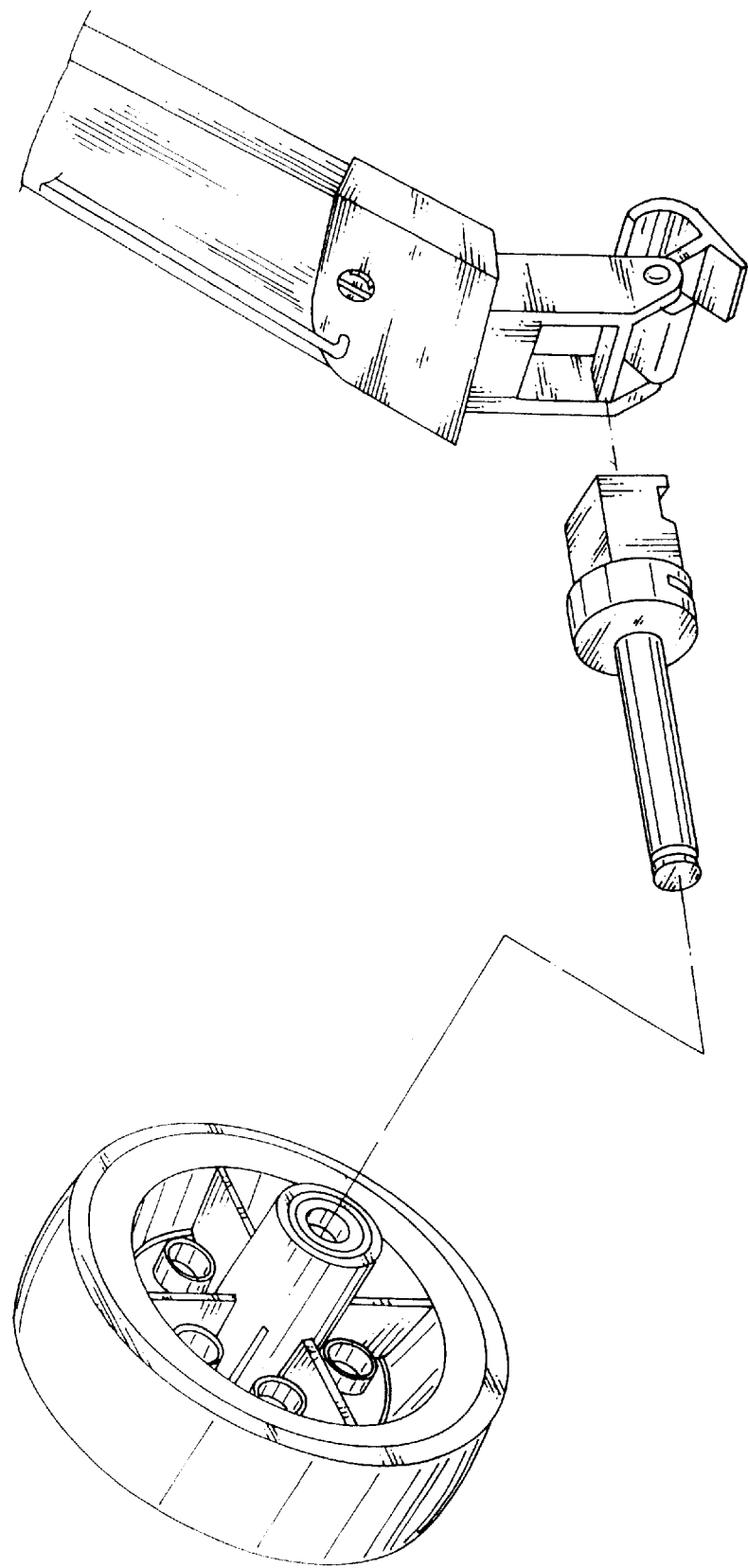
FIG. 1 is an exploded view of a wheel mounting arrangement for a golf cart according to U.S. Pat. No. 5,658,054.
Figure 2:
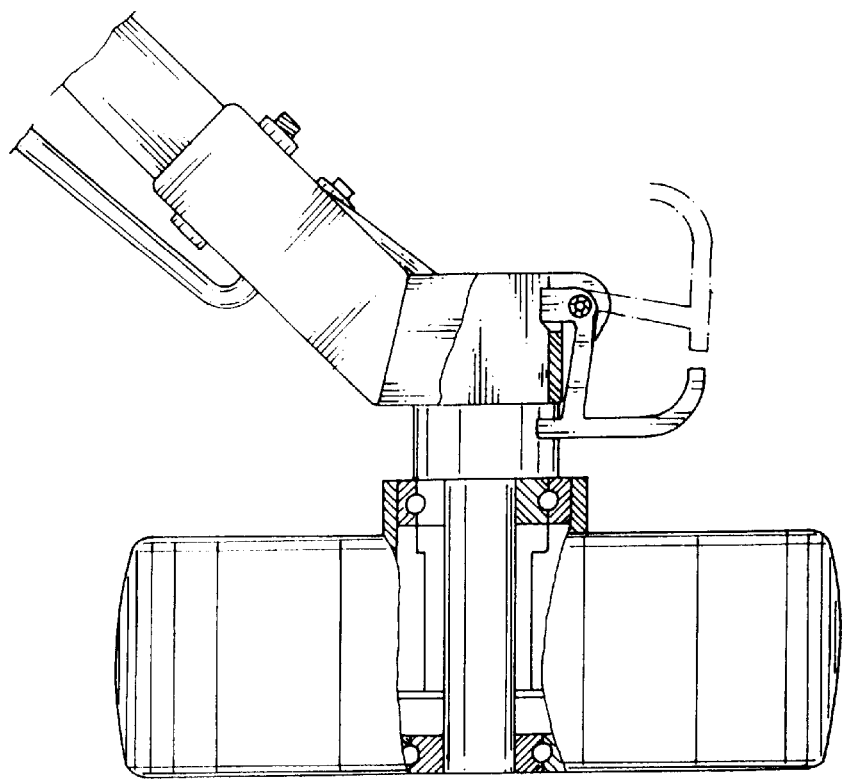
FIG. 2 is a sectional assembly view of FIG. 1.

Referring to Figures from 3 through 5, a wheel mounting structre for a golf cart in accordance with the present invention is generally comprised of a holder plate 6 connected to the main shaft of a golf cart, a wheel axle 7 fastened to the holder plate 6 to hold a wheel 5, and a lock lever 8. The holder plate 6 comprises a rectangular coupling hole 612, which receives the wheel axle 7, two parallel lugs 63 bilaterally downwardly raised from the bottom side wall thereof, and a bottom through hole 6121 through the bottom side wall between the lugs 63 in communication with the rectangular coupling hole 612. The lock lever 8 is pivotably connected between the lugs 63 by a pivot 64, and turned to lock/unlock the wheel axle 7. The wheel axle 7 comprises an elongated axle body 721 at one end fastened to the wheel 5, a rectangular coupling block 71 at an opposite end inserted into the rectangular coupling hole 612 at the holder plate 6, and a collar 72 on the middle stopped at one side of the holder plate 6 outside the rectangular coupling hole 612.

Figure 3:
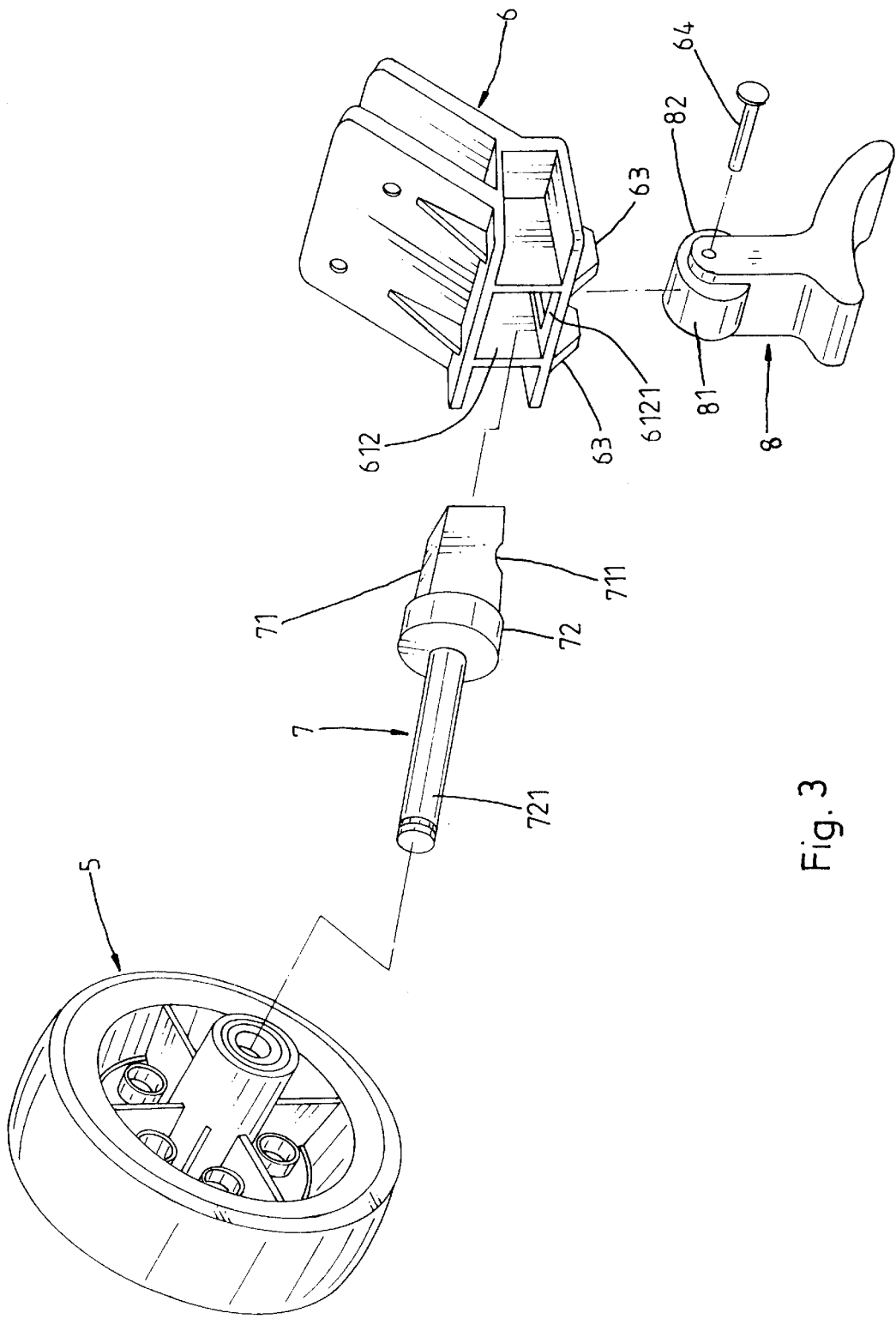
FIG. 3 is an exploded view of a wheel mounting structure according to the present invention.
Figure 4:
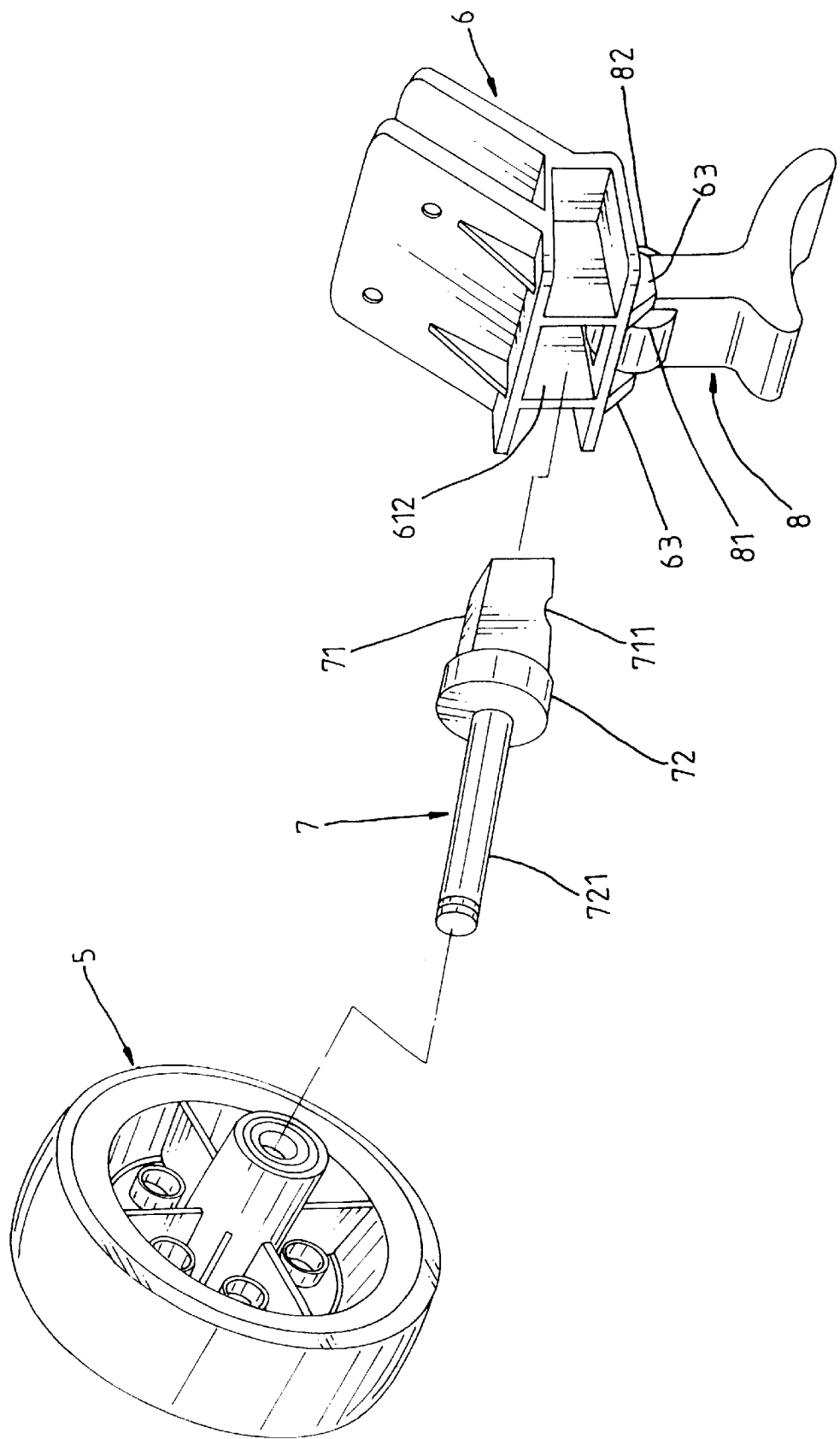
FIG. 4 is similar to FIG. 3 but showing the lock lever coupled to the holder plate.
Figure 5:
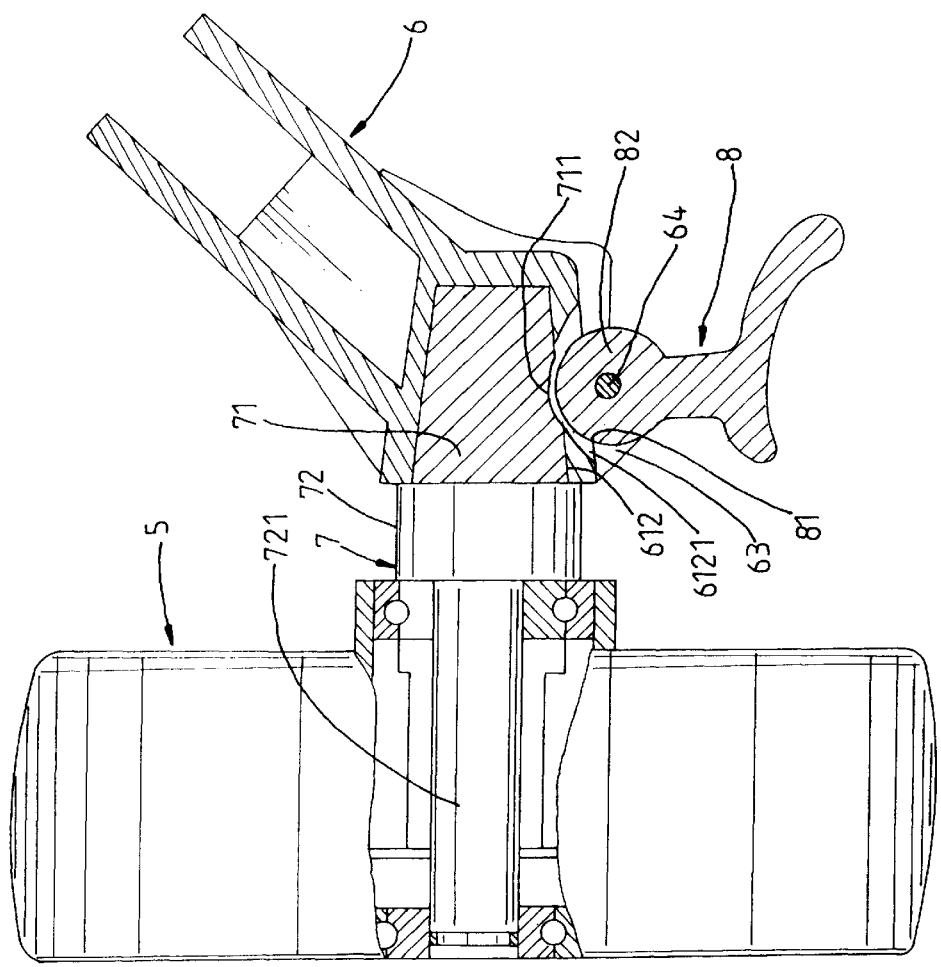
FIG. 5 is a sectional assembly view of the wheel mounting structure shown in FIG. 3.
Figure 6:
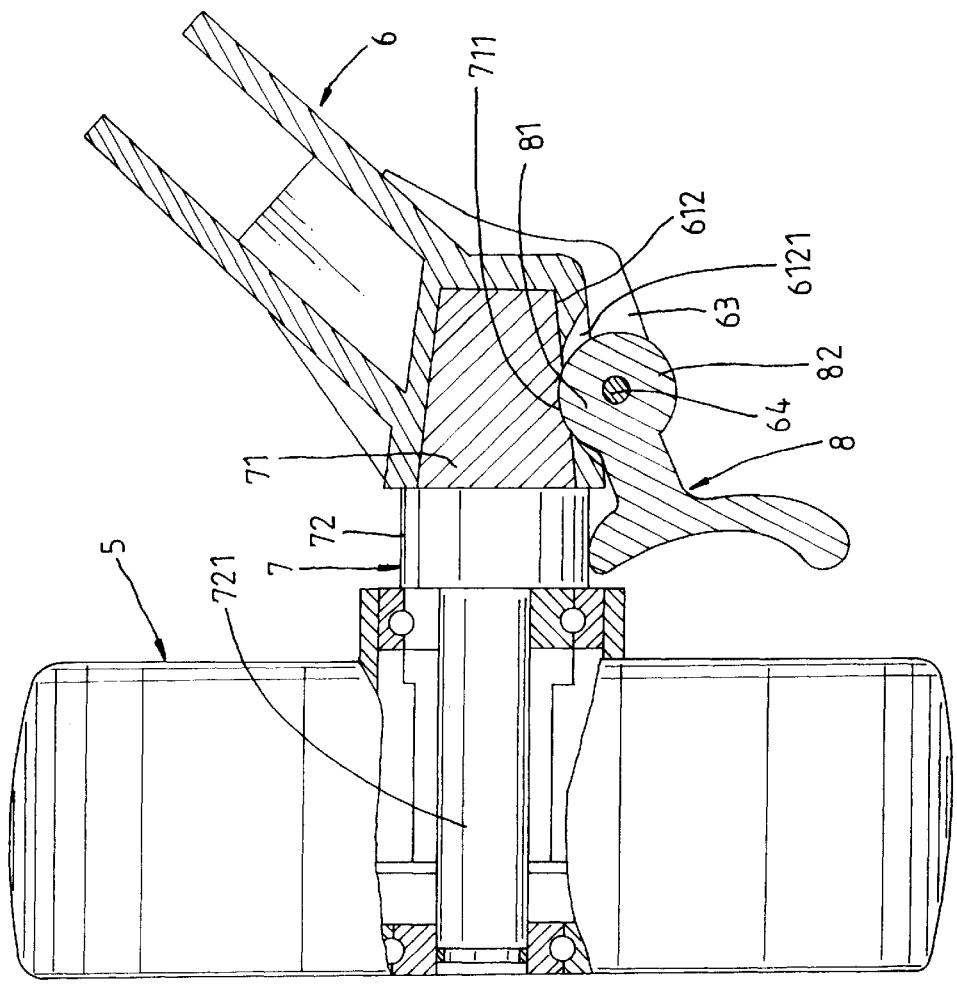
FIG. 6 is similar to FIG. 5 but showing the lock lever turned forwards, the wheel axle locked.
Figure 7:
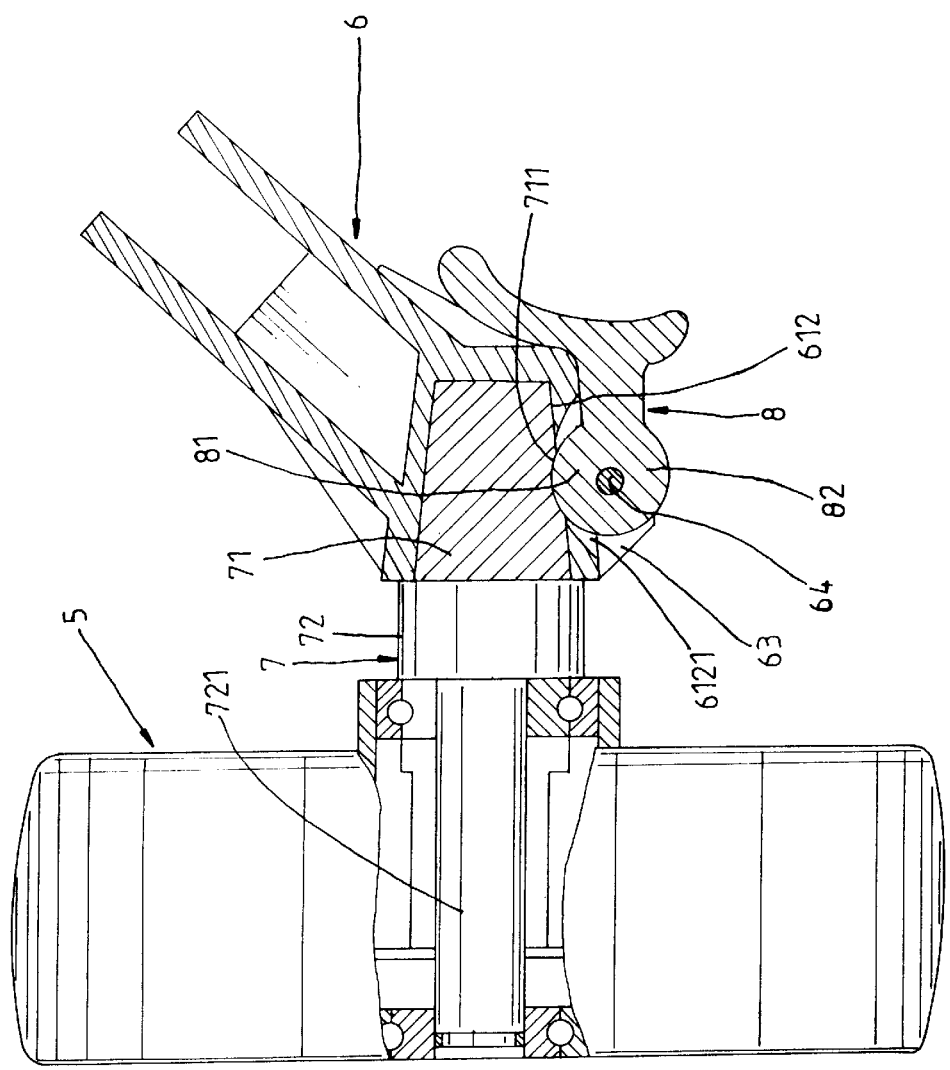
FIG. 7 is similar to FIG. 5 but showing the lock lever turned backwards, the wheel axle locked.

Referring to FIGS. 6 and 7 and FIG. 3 again, the rectangular coupling block 71 of the wheel axle 7 has a positioning groove 711 at a bottom side. The lock lever 8 comprises two engagement portions 81 and 82 bilaterally disposed on the top end thereof. When the lock lever 8 is turned forwards, one engagement portion 81 is forced through the bottom through hole 6121 at the bottom side wall of the holder plate 6 into engagement with the positioning groove 711 at the rectangular coupling block 71 to lock the wheel axle 7 in position (see FIG. 6). When the lock lever 8 is turned backwards, the other engagement portion 82 is forced through the bottom through hole 6121 at the bottom side wall of the holder plate 6 into engagement with the positioning groove 711 at the rectangular coupling block 71 to lock the wheel axle 7 in position (see FIG. 7). Whent he lock lever 8 is turned to the middle position with the first engagement portion 81 and the second engagement portion 82 bilaterally equally spaced from the positioning groove 711 at the rectangular coupling block 71 of the wheel axle 7, the wheel axle 7 is unlocked (see FIG. 5).

What is claimed is:

1. A wheel mounting structure comprising a holder plate connected to the frame of a golf cart, said holder plate having a rectangular coupling hole, a bottom side wall, and two parallel lugs downwardly extended from the bottom side wall, a wheel axle fastened to said holder plate to hold a wheel, said wheel axle having a rectangular coupling block at one end fitted into the rectangular coupling hole at said holder plate, and a lock lever pivoted to said lugs and turned to lock/unlock said wheel axle, wherein the rectangular coupling block of said wheel axle has a bottom side with a positioning groove, and said lock lever has a top end with a first engagement portion and a second engagement portion bilaterally disposed thereon for engagement with the positioning groove at the bottom side of the rectangular coupling block of said wheel axle, the first engagement portion of said lock lever cooperating with the positioning groove to lock said wheel axle upon rotary motion of said lock lever in a first direction, and the second engagement portion of said lock lever cooperating with the positioning groove upon rotary motion of said lock lever in to lock said wheel axle in a second direction that is opposite to said first direction.

2. The wheel mounting structure of claim 1 wherein said holder plate comprises a bottom through hole at the bottom side wall thereof, through which said first engagement portion and said second engagement portion of said lock lever are alternatively forced into engagement with the positioning groove at the bottom side of the rectangular coupling block of said wheel axle.

* * * * *